United States Patent
Huang et al.

[11] Patent Number: 5,869,203
[45] Date of Patent: Feb. 9, 1999

[54] ELECTROLYTE MATRIX FOR MOLTEN CARBONATE FUEL CELLS

[75] Inventors: Chao M. Huang, Danbury; Chao-Yi Yuh, New Milford, both of Conn.

[73] Assignee: Energy Research Corporation, Danbury, Conn.

[21] Appl. No.: 766,518

[22] Filed: Dec. 13, 1996

[51] Int. Cl.$^6$ .................................................... H01M 8/14
[52] U.S. Cl. .............................................. 429/46; 501/153
[58] Field of Search ....................... 429/16, 46; 501/120, 501/125, 153

[56] References Cited

U.S. PATENT DOCUMENTS

| | | | |
|---|---|---|---|
| 3,432,363 | 3/1969 | Gillis | 136/153 |
| 3,466,197 | 9/1969 | Bawa | 136/86 |
| 4,130,402 | 12/1978 | Schepers et al. | 51/309 |
| 4,308,088 | 12/1981 | Cherdron et al. | 156/603 |
| 4,317,865 | 3/1982 | Trocciola et al. | 429/41 |
| 4,322,482 | 3/1982 | Bushnell et al. | 429/41 |
| 4,329,403 | 5/1982 | Baker | 429/35 |
| 4,404,267 | 9/1983 | Iacovangelo et al. | 429/41 |
| 4,478,776 | 10/1984 | Maricle et al. | 264/83 |
| 4,538,348 | 9/1985 | Vine et al. | 29/623 |
| 4,710,436 | 12/1987 | Nakamura et al. | 429/41 |
| 4,895,774 | 1/1990 | Ohzu et al. | 429/16 X |
| 5,316,555 | 5/1994 | Ong et al. | 429/16 X |
| 5,399,443 | 3/1995 | Ong et al. | 429/46 X |
| 5,427,590 | 6/1995 | Kweon | 429/16 X |
| 5,432,138 | 7/1995 | Hofmann | 429/46 X |
| 5,580,673 | 12/1996 | Farooque et al. | 429/41 |
| 5,595,832 | 1/1997 | Tomimatsu et al. | 429/46 X |

FOREIGN PATENT DOCUMENTS

| | | |
|---|---|---|
| 0121301 | 10/1984 | European Pat. Off. . |
| 3235240 | 4/1983 | Germany . |

*Primary Examiner*—Stephen Kalafut
*Attorney, Agent, or Firm*—Robin, Blecker & Daley

[57] ABSTRACT

A matrix for a carbonate electrolyte including a support material and an additive constituent having a relatively low melting temperature and a relatively high coefficient of thermal expansion. The additive constituent is from 3 to 45 weight percent of the matrix and is formed from raw particles whose diameter is in a range of 0.1 $\mu$m to 20 $\mu$m and whose aspect ratio is in a range of 1 to 50. High energy intensive milling is used to mix the support material and additive constituent during matrix formation. Also disclosed is the use of a further additive constituent comprising an alkaline earth containing material. The further additive is mixed with the support material using high energy intensive milling.

29 Claims, 4 Drawing Sheets

5,869,203

ELECTROLYTE MATRIX FOR MOLTEN CARBONATE FUEL CELLS

STATEMENT AS TO RIGHTS TO INVENTIONS MADE UNDER FEDERALLY SPONSORED RESEARCH AND DEVELOPMENT

This invention was made with Government support under contract DE-FG05-93ER81512 awarded by the Department of Energy. The Government has certain rights in the invention.

BACKGROUND OF THE INVENTION

This invention relates to molten carbonate fuel cells and, in particular, to an electrolyte matrix for use in such cells.

Molten carbonate fuel cell (MCFC) power plants offer a highly efficient and environmentally clean option for power generation. A key component in a MCFC is the electrolyte matrix that provides both ionic conduction and gas sealing. The conventional electrolyte matrix is a porous, unsintered $\gamma$-$LiAlO_2$ ceramic powder bed impregnated with molten alkali carbonate electrolyte. It is essential for the electrolyte matrix to remain substantially crack or defect free to provide effective gas sealing during MCFC operations.

During such operation, the matrix experiences both mechanical and thermal stresses, and these stresses are believed to be the major contributing factors in causing matrix cracking. The difference in mechanical characteristics of active and wet seal areas of the matrix can cause high mechanical stress on the matrix. The thermal expansion mismatch between the carbonate electrolyte and ceramic particles, in addition to the large change in electrolyte volume associated with freezing/melting, causes high thermal stress on the matrix.

More particularly, the difference in thermal expansion coefficients between the $LiAlO_2$ ceramic particles (less than $10 \times 10^{-6}/°C$.) and the carbonate electrolyte (greater than $20 \times 10^{-6}/°C$.) can generate a significant amount of compressive stress on the $LiAO_2$ particles and tensile stress on the carbonates during cooling. For a temperature decrease of ~400° C. (from the 488° C. solidification temperature of the Li/K eutectic carbonate to ambient temperature), this thermal stress can exceed 3,000 psi. This is much greater than the strength of the frozen carbonates (approximately 2,000 psi). Therefore, even in the absence of mechanical stress, the thermal stress generated by the thermal expansion mismatch is sufficient to cause cracking of the matrix during thermal cycling. Accordingly, the electrolyte matrix, without any additional second-phase reinforcement, can develop thru-cracks after only one thermal cycle due to high thermal stress.

The matrix can also experience cracking during initial MCFC stack start-up. During this period, organic binders in the matrix are removed (burnt off), nearly completely at about 350° C. The resulting binderless matrix of unsintered ceramic powder bed is very weak in structure (even weaker than the matrix impregnated with carbonate during the 650° C. operation) before impregnation by carbonate above the carbonate melting temperature (~488° C. for the Li/K eutectic). Therefore, the matrix is very susceptible to mechanical or thermal cracking in the 350° C. to ~500° C. start-up temperature range. Such cracks can propagate to large sizes during MCFC operation.

The matrix cracking during either start-up or operation permits undesired fuel and oxidant gas cross leakage, causing lower power generation efficiency, shorter life and, more importantly, poor power plant economy. Therefore, providing strong and tough matrices resistant to cracking to maintain good sealing capability is highly desired.

Various approaches for improving electrolyte matrix cracking resistance have been proposed. A number of these approaches are based on incorporating secondary reinforcing phases into the matrix. These secondary reinforcements have the form of large particles (see U.S. Pat. No. 4,322,482 and U.S. Pat. No. 4,538,348), fibers (see U.S. Pat. No. 5,316,555), metal wire mesh screens (see U.S. Pat. No. 3,432,363) and metal powders (Al, Zn) (see U.S. Pat. No. 3,466,197). Moreover, they act as crack attenuators and deflectors to slow crack propagation or to enhance the bonding between the ceramic support materials, resulting in improved matrix strength and toughness.

Where the reinforcements act as crack deflectors, (i.e., fibers, screens, particles), unsintered ceramic particles (including the secondary reinforcements) in the matrices are merely bonded with the impregnated carbonate of low strength. As a result, thermal stress alone can still generate microcracks in the matrix. Microcracks can also be generated by mechanical stress, particularly during the start-up after binder burnout. Although these microcracks are not of a size which allows fuel and oxidant gas cross leakage during initial fuel cell operation, they can eventually propagate to larger sizes, causing increased cross leakage after several thermal cycles.

The aforesaid microcracking can be reduced by the use of reinforcements which enhance bonding. Thus, dispersed metal powder phase (Al, Zn) reinforcements can sinter to provide higher strength during both start-up and operation. A higher strength is essential for reducing microcracking. The low melting points of the metal phases, ~660° C. for Al and ~419° C. for Zn are required for producing the sintering.

While the use of metal bonding reinforcements thus increases matrix strength, it would be advantageous to provide further procedures and matrix configurations which result in added strength for the matrices.

It has also been known to incorporate into the electrolyte of carbonate fuel cells alkaline earth additives ($Mg^{++}$, $Ca^{++}$, $Sr^{++}$, $Ba^{++}$). These additives are homogeneously mixed with the electrolyte and flow into the matrix with the electrolyte during start-up of the cell.

The presence of the additives suppresses dissolution of NiO in the cell cathode electrodes. If such dissolution is allowed to occur it can cause metallic deposition in the matrix which can result in cell shorting.

While incorporation of such alkaline earth additives in the electrolyte is thus desirable, the quantity of additive has been limited. Additionally, the uniformity of the additive when resident in the matrix has also been limited.

It is an object of the present invention to provide an electrolyte matrix of increased strength.

It is a further object of the present invention to provide a method for fabricating such increased strength electrolyte matrix.

It is an additional object of the invention to provide an electrolyte matrix having increased amounts and improved uniformity of alkaline earth additives.

SUMMARY OF THE INVENTION

In accordance with the principles of the present invention, the above and other objectives are realized in a matrix which includes a support material and an additive constituent. The additive constituent includes a material having a relatively low melting point and a relatively high thermal coefficient of expansion for strengthening the matrix, the latter material being present in the matrix in an amount from 3 to 45 volume percent and being formed from raw particles having a size of between 0.1 and 20 $\mu$m in diameter and an aspect ratio of between 1 and 50. Preferably, the additive material is one or more of Al, $Li_2CO_3$, $Li/KCO_3$, $Li/NaCO_3$ and other precursors of Li.

In a further aspect of the present invention, a method of making the electrolyte matrix is provided in which high-energy intensive milling is used to mix the support material and additive constituent.

In still a further aspect of the present invention, a matrix is provided having a support material and an additive constituent which contains an alkaline earth containing material (e.g., $Mg^{++}$, $Ca^{++}$, $Sr^{++}$ or $Ba^{++}$), and which additive constituent has been added to and mixed with the support material during forming of the matrix. This addition and mixing is preferably carried out with the additive constituent in particle form and preferably using high energy intensive milling to result in a particle size of the constituent of less than 0.5 $\mu$m. This permits larger quantities of the alkaline earth additive constituent to reside in the matrix and provides a more uniform mixture of the additive and support materials. A matrix having improved resistance to NiO cathode dissolution results.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
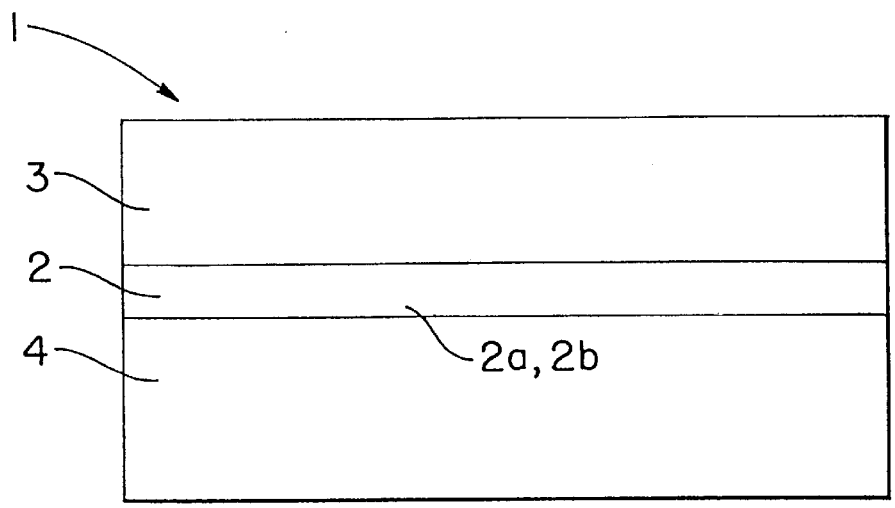
FIG. 1 shows a molten carbonate fuel cell utilizing an electrolyte matrix in accordance with the principles of the present invention.

FIG. 1 shows a molten carbonate fuel cell 1 including an electrolyte matrix 2 in accordance with the principles of the present invention. The fuel cell 1 further includes an anode section 3 and a cathode section 4 which together sandwich the matrix 2. The anode and cathode sections are fed fuel and oxidant gas, respectively, and these gases undergo electrochemical conversion in the presence of the molten carbonate electrolyte in the matrix 2 to produce electricity.

The matrix 2 comprises a support material 2a and an additive constituent 2b. The support material typically comprises a ceramic material of sub-micron particle size. Typical ceramic materials might be $\gamma$-$LiAlO_2$, $\alpha$-$LiAlO_2$, $\beta$-$LiAlO_2$ and other ceramic materials stable in the molten alkali carbonate electrolyte, such as $CeO_2$ (see U.S. Pat. No. 4,317,865).

In accordance with the invention, the additive constituent 2b comprises a material having a low melting point (below about 900° C.) and a high coefficient of thermal expansion (greater than $10 \times 10^{-6}$/°C.) relative to the support material 2a. The low melting point of the additive constituent allows the particles of the additive material to sinter together or with the ceramic particles of the support material. This permits the bonding of these materials in situ at or below the operating temperature (i.e., 650° C.) of the fuel cell 1. The relatively high coefficient of thermal expansion of the additive material allows the thermal stress surrounding the ceramic material particles to be released by the adjacent additive material particles.

In addition to the low melting point and high coefficient of thermal expansion, the additive material (or the associated reaction products) also has chemical stability in the carbonate electrolyte environment, while being able to react with such electrolyte during the bonding formation process. The reaction products, which are chemically compatible with the electrolyte at the fuel cell operating temperature, are highly desired for the bonding stability during long-term fuel cell operation. The amount of additive material used for the matrix 2 is controlled such that the material provides sufficient bonding strength without causing electronic shorting (for metal additives) or significant electrolyte loss. The additive material (or the associated reaction products) is also required to have good wettability with the electrolyte in order to enhance the bonding formation.

In accordance with the invention, the volume percent of additive material is from between 3 to 45 volume percent of the total volume of the matrix. Also, in accordance with the invention, the particle size of the additive material is selected such that the particles can intimately contact each other during bonding formation. Particles whose raw particle size is from 0.1 to 20 $\mu$m in diameter and who have an aspect ratio of between 1 and 50 are believed to satisfy this requirement.

An additive material having the above characteristics and able to be provided in the size required is aluminum. Also, aluminum slowly reacts with the carbonate melt to form a solid, stable and wettable $LiAlO_2$.

Other materials having these characteristics are $Li_2CO_3$, $Li/KCO_3$, $Li/NaCO_3$ and other Li-containing precursors (formate, acetate, etc.) which can be converted to carbonate. These Li containing carbonates have the additional property of compensating for any Li loss during $LiAlO_2$ formation. The Li loss due to other causes (creepage, corrosion oxide formation, evaporation) can also be compensated. The use of $Li_2CO_3$ content in the matrix has the additional benefit of enhancing cell performance and reducing electrolyte migration.

If Al metal is used as the additive, it can also be in the form of fiber. Moreover, high Al content is desired for a strong bonding, but electrical short circuiting may occur for 45 vol % or more of Al due to percolation of the conductive Al phase. Other electrically nonconductive matrix layers can also be used and laminated with the reaction bonded matrix of high Al content to prevent cell short circuiting.

In further accord with the invention, a method of fabricating the electrolyte matrix 2 is used which permits the support material 2a and additive constituent 2b of the matrix to be brought into intimate contact. More particularly, high-energy intensive milling of the particles of the support and additive materials is used. This produces highly active particles of smaller size for enhanced sintering bonding. Mechanical alloying to form such highly active particles occurs during the intensive milling. Additionally, interparticle bonding by the mechanical alloying also starts during the intensive milling operation. Representative high-energy intensive milling procedures which can be used for the fabrication process include attrition milling, fluid energy grinding milling and ball milling using small grinding media.

EXAMPLES (1) Electrolyte Matrix With Al Additive

A mixture of 85 vol % fine γ-lithium aluminate powder ($\geq 1$ μm) and 15 vol % aluminum powder (~5 μm, 99.8% Alfa) was dispersed in a liquid vehicle of organic solvents and binders, by ball milling using ¼" alumina grinding spheres. The fine lithium aluminate powder was first milled alone for 24 hours. The Al powder was then added and the slurry milled for an additional 18 hours.

Figure 2:
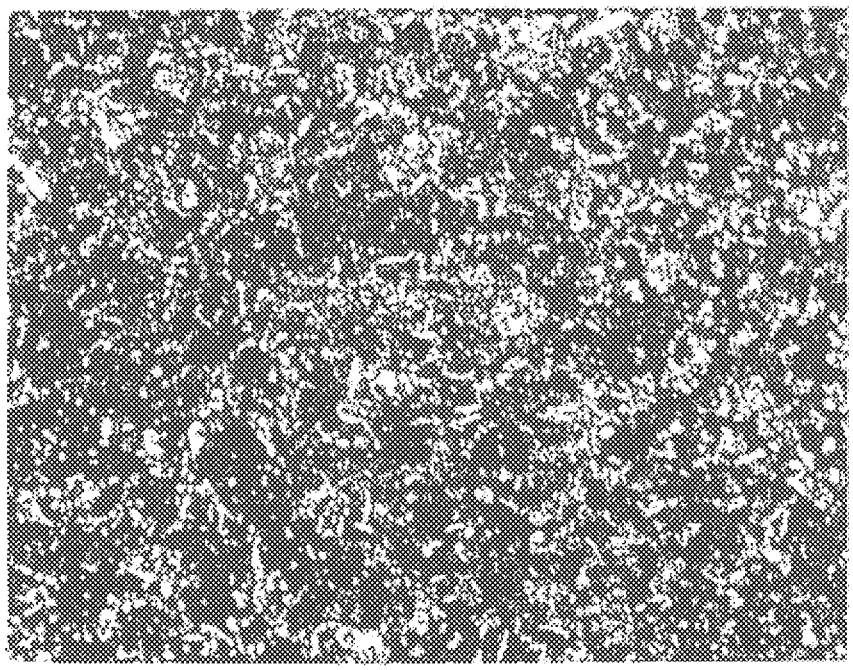
FIG. 2 shows an optical micrograph of an unsintered electrolyte element which can be used to form the electrolyte matrix of FIG. 1.
Figure 3:
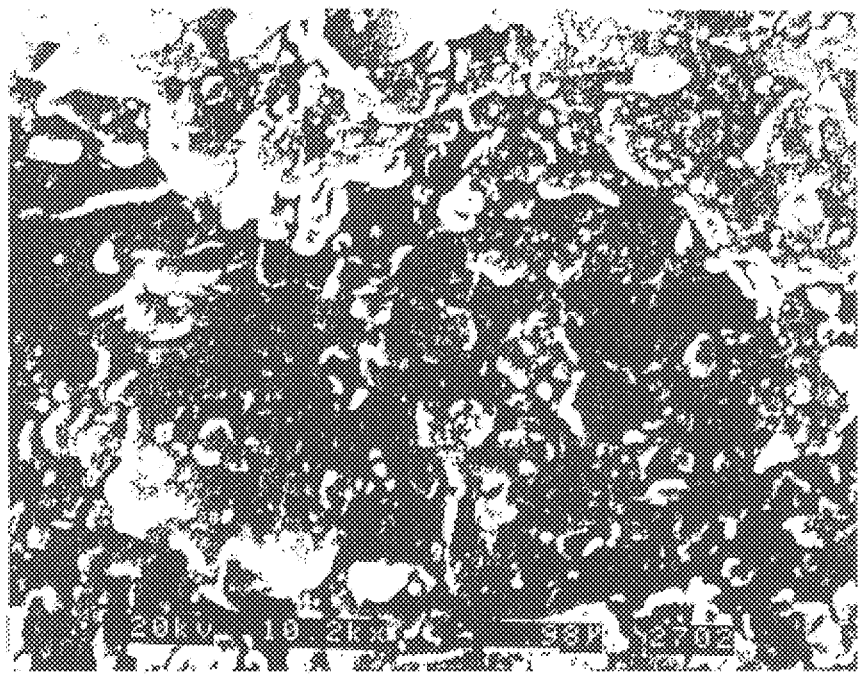
FIG. 3 shows an SEM micrograph of the electrolyte element of FIG. 2 after sintering.

The slurry was tape casted using a doctor blade, resulting in a flat and flexible green tape after drying. An optical micrograph of the tape depicted in FIG. 2 shows the uniformly distributed aluminum particles (bright phase) in the green tape. These aluminum particles were sintered together with the surrounding lithium aluminate ceramic particles during an organic burnout procedure in which the tape was heated to 650° C. (FIG. 3). The burnout tape forming an electrolyte matrix element is shown in FIG. 3 and evidenced significant mechanical strength improvement. Three-point bending testing indicated that the mechanical strength of the element was about three folds larger than the conventional tape without such reinforcement.

Figure 4:
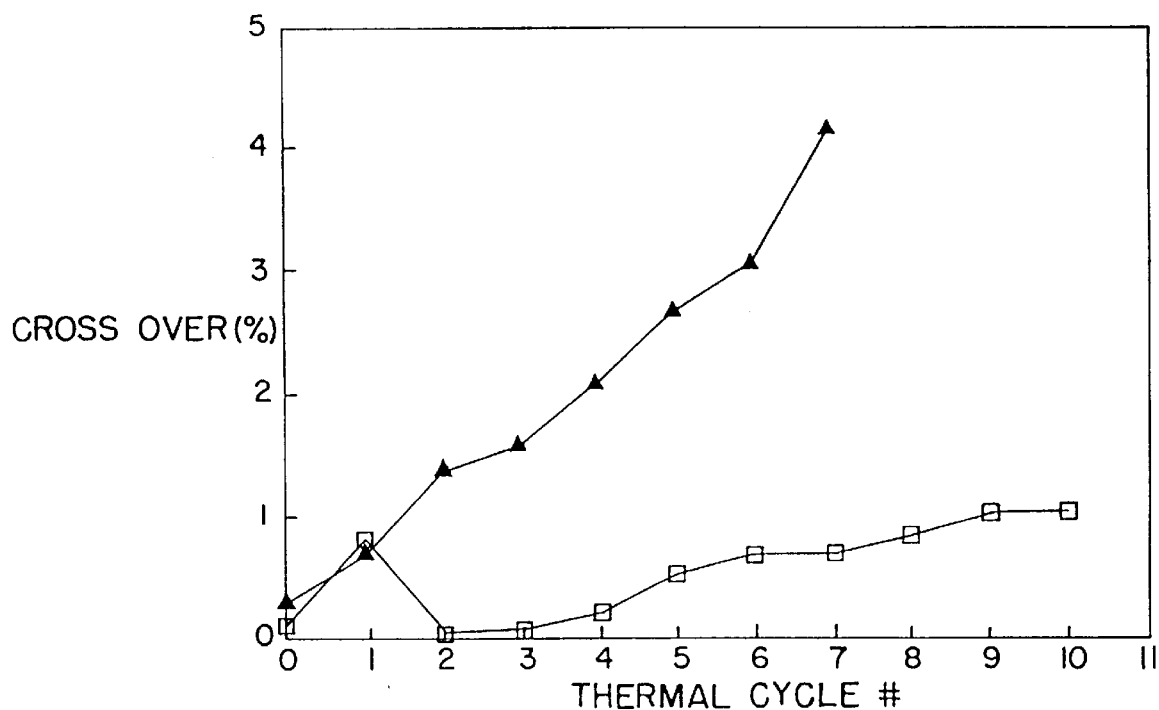
FIG. 4 illustrates a plot of gas crossover versus thermal cycle for an electrolyte matrix of the invention and a conventional matrix.

Several 7"×7" electrolyte matrix elements were laminated into a thickness of about 0.03" to form an electrolyte matrix for single MCFC testing. The results of this testing shown in FIG. 4 indicate that the matrix of the invention provided a significantly improved sealing capability and thermal cycleability. A low $N_2$ cross-over (<1%) is an indication of good gas seal efficiency. After 2,000 h operation with 10 thermal cycles, the measured cross-over was below 1%.

Figure 5:
FIG. 5 shows an optical micrograph of the matrix of the invention after 2000 hours of operation.

The MCFC with the matrix of the invention also exhibited an improved strength to withstand a larger gas pressure difference across the matrix. The cross-over was only 1.6% with 15" gas cross pressure on the matrix after 10 thermal cycles. Cell post testing indicated that the matrix, both in the active and wet seal areas, remained intact after the 2,000 h operation. Cracking of the matrix was not observed under optical microscopy which is evidenced by FIG. 5.

X-ray diffraction analysis (XRD) was conducted on the post-test matrix to determine the reaction products after cell operation. Aluminum oxide and lithium aluminate were determined to be the only reaction products. XRD results also indicated the existence of unreacted aluminum particles in the matrix.

2. Electrolyte Matrix With Al and $Li_2CO_3$ Additives

A mixture of 61 vol % fine γ-lithium aluminate powder ($\geq 1$ μm) and 14 vol % aluminum powder (5 μm, 99.8%, Alfa) and 25 vol % $Li_2CO_3$ (5 μm, FMC) was dispersed in a liquid vehicle of organic solvents and binders, by ball milling using ¼" alumina grinding spheres. The fine lithium aluminate and $Li_2 CO_3$ powders were first milled for 24 hours. The Al powder was then added and the slurry milled for an additional 18 hours.

The slurry was tape casted using a doctor blade, resulting in a flat and flexible green tape after drying. The burnout procedure in which the tape was heated to 650° C. produced an electrolyte matrix element having significant improvement in mechanical strength. Three-point bending testing indicated that the mechanical strength of the electrolyte matrix element was about six folds larger than the conventional tape without such reinforcement.

Several 7"×7" electrolyte matrix elements were laminated into a thickness of about 0.03" for single MCFC testing. This testing showed that the matrix of the invention provided a significantly improved sealing capability and thermal cycleability. A low $N_2$ cross-over (<1%) is an indication of good gas sealing efficiency. After 880 h operation with 6 thermal cycles, the measured cross-over was below 1%.

In a further aspect of the present invention, the high-energy intensive milling technique discussed above is utilized to form a matrix 2 comprising support materials 2a as above described and an additive constituent 2b which includes an alkaline earth material, i.e., $Mg^{++}$, $Ca^{++}$, $Sr^{++}$ and $Ba^{++}$. This additive constituent can be in the form of an oxide or carbonate of the alkaline earth materials.

The high-energy intensive milling is carried out by adding the alkaline earth containing additive constituent in particulate form to a slurry of the support material and then milling such that after completion of the milling the resultant particle size of the additive is less than 0.5 μm. Also, the milling operation can be performed by using attrition milling, fluid energy milling or ball milling with small grinding media.

The mixture of support material and alkaline earth containing additive is then tape cast to form a matrix element and the element itself, or several such elements laminated together, form a completed matrix. In such a matrix, the amount of alkaline earth additive constituent should be less than 10 volume percent of the matrix. Heating of the matrix, in or out of the fuel cell, results in burnout of any binders used in formation of the matrix.

A composite matrix can also be formed by using one or more of the Al, $Li_2CO_3$, $Li/KCO_3$, $Li/NaCO_3$ additive constituents with the particle size described above for these constituents (between 0.1 and 20 μm diameter and aspect ratio of between 1 and 50) and the alkaline earth containing constituent with the particle size described above for this constituent (less than 0.5 μm). In such a matrix, the total amount of combined additive constituents should be maintained in a range of from 3 to 45 volume percent.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. A matrix for carrying a carbonate electrolyte comprising a support material and an additive constituent having a low melting point and high thermal coefficient of expansion, said additive constituent being present in the amount of 3 to 45 volume percent of said matrix and having been formed from raw particles whose diameter is in a range of 0.1 μm to 20 μm and whose aspect ratio is in the range of 1 to 50, said additive material having been formed from one or more of raw particles of Al, raw particles of $Li_2CO_3$ and raw particles of Li-containing precursors.

2. The matrix of claim 1 wherein:
said support material is a ceramic.

3. The matrix of claim 2 wherein:
said ceramic material is one of lithium aluminate and $CeO_2$.

4. A matrix in accordance with claim 1 further comprising:
a further additive constituent comprising an alkaline earth containing material.

5. A matrix in accordance with claim 4 wherein:

said alkaline earth containing material is of a particle size which is less than 0.5 μm.

6. A matrix in accordance with claim 4 wherein:

said alkaline earth containing material contains one or more of $Mg^{++}$, $Ca^{++}$, $Sr^{++}$ and $Ba^{++}$.

7. A matrix in accordance with claim 6 said alkaline earth containing material is an oxide or carbonate of one or more of $Mg^{++}$, $Ca^{++}$, $Sr^{++}$ and $Ba^{++}$.

8. The matrix of claim 1 further comprising:

a reinforcement constituent including one or more of a ceramic fiber, ceramic particulate and metal mesh.

9. The matrix of claim 1 further comprising:

a carbonate electrolyte within said matrix.

10. A fuel cell comprising:

an anode section;

a cathode section;

an electrolyte matrix sandwiched between said anode section and said cathode section, said electrolyte matrix comprising: a support material and an additive constituent having a low melting point and high thermal coefficient of expansion, said additive constituent being present in the amount of 3 to 45 volume percent of said matrix and having been formed from raw particles whose diameter is in a range of 0.1 μm to 20 μm and whose aspect ratio is in the range of 1 to 50, said additive material having been formed from one or more of raw particles of Al, raw particles of $Li_2CO_3$ and raw particles of Li-containing precursors.

11. A fuel cell in accordance with claim 10 further comprising:

a further additive constituent comprising an alkaline earth containing material.

12. A fuel cell in accordance with claim 11 wherein:

said alkaline earth containing material is of a particle size which is less than 0.5 μm.

13. A fuel cell in accordance with claim 11 wherein:

said alkaline earth containing material contains one or more of $Mg^{++}$, $Ca^{++}$, $Sr^{++}$ and $Ba^{++}$.

14. A fuel cell in accordance with claim 13 wherein:

said alkaline earth containing material is an oxide or carbonate of one or more of $Mg^{++}$, $Ca^{++}$, $Sr^{++}$ and $Ba^{++}$.

15. A fuel cell in accordance with claim 10 wherein:

said support material is a ceramic.

16. A fuel cell in accordance with claim 15 wherein:

said ceramic material is one of lithium aluminate and $CeO_2$.

17. A fuel cell in accordance with claim 10 wherein:

said electrolyte matrix further comprises a reinforcement constituent including one or more of a ceramic fiber, ceramic particulate and metal mesh.

18. A fuel cell in accordance with claim 10 further comprising:

a carbonate electrolyte within said matrix.

19. A method of making a matrix for carrying a carbonate electrolyte comprising:

providing a support material;

providing an additive constituent having a low melting point and a high thermal coefficient of expansion, said additive constituent being formed of particles whose diameter is in the range of 0.1 μm to 20 μm and whose aspect ratio is in the range of 1 to 50;

mixing said support material and additive constituent including intensive milling of said support material and, thereafter, adding said additive constituent to said support material and intensive milling of said additive material and said support material to form a mixture; and;

forming said mixture into a coherent member to provide said matrix.

20. A method in accordance with claim 19 wherein:

said additive material is one or more of Al, $Li_2CO_3$, $Li/KCO_3$, $Li/NaCO_3$ and Li-containing precursors.

21. A method in accordance with claim 19 wherein:

said method further comprises providing a further additive including an alkaline earth containing material;

said step of mixing is carried out by mixing said additive, further additive and support material including high energy intensive milling of said additive, further additive and support material.

22. A method in accordance with claim 21 wherein:

at the completion of said mixing step, said alkaline earth containing material is of a particle size which is less than 0.5 μm.

23. A method in accordance with claim 21 wherein:

said alkaline earth containing material contains one or more of $Mg^{++}$, $Ca^{++}$, $Sr^{++}$ and $Ba^{++}$.

24. A method in accordance with claim 21 wherein:

said alkaline earth containing material is an oxide or carbonate of one or more of $Mg^{++}$, $Ca^{++}$, $Sr^{++}$ and $Ba^{++}$.

25. A method in accordance with claim 19 wherein:

providing said support material includes dispersing said support material in a liquid vehicle;

said intensive milling of said support material is carried out with said support material dispersed in said liquid vehicle;

said adding of said additive constituent includes dispersing said additive material in said liquid vehicle with said support material dispersed therein after said intensive milling of said support material;

and said intensive milling of said support material and said additive constituent is carried out with said support material and said additive constituent dispersed in said liquid vehicle.

26. A method in accordance with claim 25 wherein:

said forming includes casting said mixture of support material and said additive material and drying said casted mixture to form said coherent member.

27. A method in accordance with claim 25 further comprising:

heating said coherent member to sinter the additive constituent.

28. A method in accordance with claim 27 further comprising:

adding carbonate electrolyte to said coherent member.

29. A method in accordance with claim 28 wherein:

said heating occurs with said coherent member assembled into a fuel cell.

* * * * *

UNITED STATES PATENT AND TRADEMARK OFFICE
CERTIFICATE OF CORRECTION

PATENT NO. : 5,869,203
DATED : February 9, 1999
INVENTOR(S) : Chao M. Huang et al.

It is certified that error appears in the above-identified patent and that said Letters Patent is hereby corrected as shown below:

Col. 5, line 8, delete "$\geq$" and insert -- $\leq$ --.
Col. 5, line 53, delete "$\geq$" and insert -- $\leq$ --.

Signed and Sealed this

Fourth Day of January, 2000

Attest:

Attesting Officer

*Acting Commissioner of Patents and Trademarks*